Nov. 14, 1961   R. F. SNYDER   3,009,046
ELECTRIC TEMPERATURE CONTROL
Filed Sept. 4, 1959

INVENTOR.
ROBERT F. SNYDER
BY
J. B. Holden
ATTORNEY

United States Patent Office 3,009,046
Patented Nov. 14, 1961

3,009,046
ELECTRIC TEMPERATURE CONTROL
Robert F. Snyder, Lakemore, Ohio, assignor to The Goodyear Tire & Rubber Company, Akron, Ohio, a corporation of Ohio
Filed Sept. 4, 1959, Ser. No. 838,188
14 Claims. (Cl. 219—20)

This invention relates to controls for electrical heating units and particularly to the control of electrical heating units for use with tire vulcanization equipment.

The accurate control of the temperature generated in an electrical resistance heating unit has long presented difficult problems. This is particularly true where it is desired to utilize electrical heating in fields such as tire vulcanization and retreading where the quality of product is critically dependent upon the vulcanization temperature. While many problems must be faced, one of the more important considerations is the provision of an electrical control unit which can accurately sense and control the temperature in the system so that it remains substantially constant within a narrow range of high temperatures. Yet the control unit must also withstand severe service conditions. In addition the control should be extremely stable electrically and remain substantially unaffected by transient variations in the system it is to control. Control systems proposed in the past have failed to satisfy these requirements in a simple and dependable manner. As the description of the present invention proceeds it will become clear that it provides a flexible, stable, and yet highly sensitive control for electrical heating systems. Although it will be obvious that the electrical control described in the present case may be easily adapted to regulate electrical heating systems used in a wide variety of applications, the present invention will be described in relation to a tire retreading system since it is particularly useful in that field.

The steps involved in a conventional tire retreading operation are well known and need not be repeated here. An ample description of such may be found in application Serial No. 665,795, now Patent No. 2,938,100, filed June 14, 1957, and entitled, "Tire Retreading." In general, conventional retreading methods which utilize molds heated about only the outer periphery are slow, difficult to control to assure an effective and optimum cure, and subject to errors in judgement by the operator. This is particularly true in retreading operations where a large quantity of tires must preferably be processed in a relatively short period of time in order that the cost of retreading be minimized.

It is therefore a primary object of the present invention to provide method and apparatus for rapidly and efficiently effecting the vulcanization of a tire, particularly of a new tread to a tire carcass. It is a further object of the present invention to provide a stable and rugged automatic control system for an electrical heating unit. It is an additional object of the present invention to provide method and apparatus to control an electrical heating unit and maintain its temperature substantially constant within a narrow range of high temperatures. It is a further object of the present invention to provide an electrical control system which minimizes the in-mold time required to effect cure of a tire or a retread. These and other objects will become apparent from the following description and drawings in which:

As previously mentioned, conventional retreading operations are in general very time consuming and exacting. The principal reason for this is that in conventional methods heat is applied to the tire only about the outer periphery. This has raised problems in that, in order to obtain optimum cure throughout the tire or new tread, the total cure time is usually quite lengthy. Thus, costly retreading equipment is tied up for long periods with the resulting low productivity and the risk of inferior results. A method and apparatus for retreading tires which materially shortens the total cure time and simultaneously assures an even cure is obviously to the great advantage of a retread shop. The patent application previously referred to discloses a system having such capabilities and may be referred to for a complete and detailed description of such a system. In general, however, for the purposes of the present description, it is only necessary to know that the apparatus there described comprises a conventional steam heated outer mold in conjunction with which are utilized electrical heating elements placed adjacent the inner surface of the tire to be vulcanized. An electrical control circuit senses the temperature in both the steam and electrical portions of the mold, compares these temperatures, and automatically corrects the amount of heat energy supplied by the electrical elements to maintain a substantially constant temperature differential across the tire. While such a system has been found to shorten the total cure time by approximately a factor of one-half and hence to effect substantial savings, it has been found that under certain circumstances the control system utilized does not provide an optimum cure in the shortest possible time. One of the difficulties encountered with such a control is that variations in the voltage of the power supply appear to the control to be variations in mold temperature which introduces an error into the system. In addition, it has been found that in vulcanizing larger sized tires the cycling interval time control utilized does not permit rapid heating of the tire in the early stages of the operation and makes it difficult to maintain tire temperatures substantially constant during the cure cycle. A control system may be found described in application Serial No. 725,262 filed March 31, 1958, and entitled, "Electrical Temperature Control Apparatus," which successfully avoids the problem of certain inherent instabilities in the first mentioned apparatus including the problem of power supply voltage variations. However, the latter referred to apparatus does not adequately deal with the problems of slow initial tire heating and substantial temperature variation during the cure cycle. It will become apparent from the description of the present invention that these problems are successfully dealt with and a high speed optimum cure system is provided in a relatively simple and yet stable control apparatus.

Figure 1:
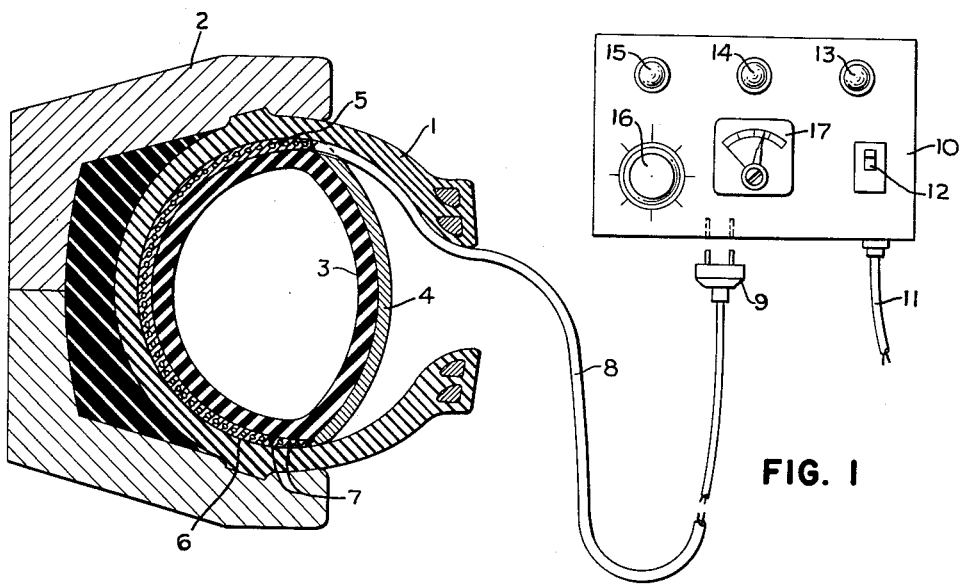
FIG. 1 illustrates a complete vulcanization system for retreading a tire.

Referring to FIG. 1, a complete retreading system of the general type previously mentioned is illustrated. The system comprises a tire 1 enclosed in a conventional steam retreading mold 2. A curing tube or bladder 3 is located inside the tire, backed by a curing ring or rim 4. An elastomeric electrical heating element 5 is located between the curing tube 3 and the inner peripheral face 6 of the tire 1. The heating element 5, which may be replaced by a plurality of elements if desired, contains a resistance heating wire 7 arranged in sinuous fashion throughout the element 5. The wire 7 is usually encased in material such as fiber glass so that it can move relatively freely with respect to the rubber as it expands and contracts due to temperature variations, and also to absorb the physical stresses caused by deformation of the unit when it is inserted or extracted from the tire. The heating element 5 is connected through cord 8 and plug 9 to a control box 10 which houses the electrical control circuit. The control box is supplied with power from a conventional commercial source (not shown) through a conductor 11. On the face of control box 10 may be seen the main off-on switch 12, power-on light 13, heating light 14, and cure-finish indicator light 15.

In addition the master timer 16 and meter relay 17 are mounted in the face of control box 10. In operation, timer 16 is set for the total cure time for the tire to be retreaded and the power-on switch 12 closed. The control circuit housed in the box 10 causes power to be sent to the heating element 5 to bring the interior of the tire to the required cure in temperature. During the vulcanization process the control system senses the temperature in the steam portion of the mold as well as that in the electrical portion, compares the two, and varies the power to the heating element 5 as necessary to maintain a pre-established temperature differential.

Figure 2:
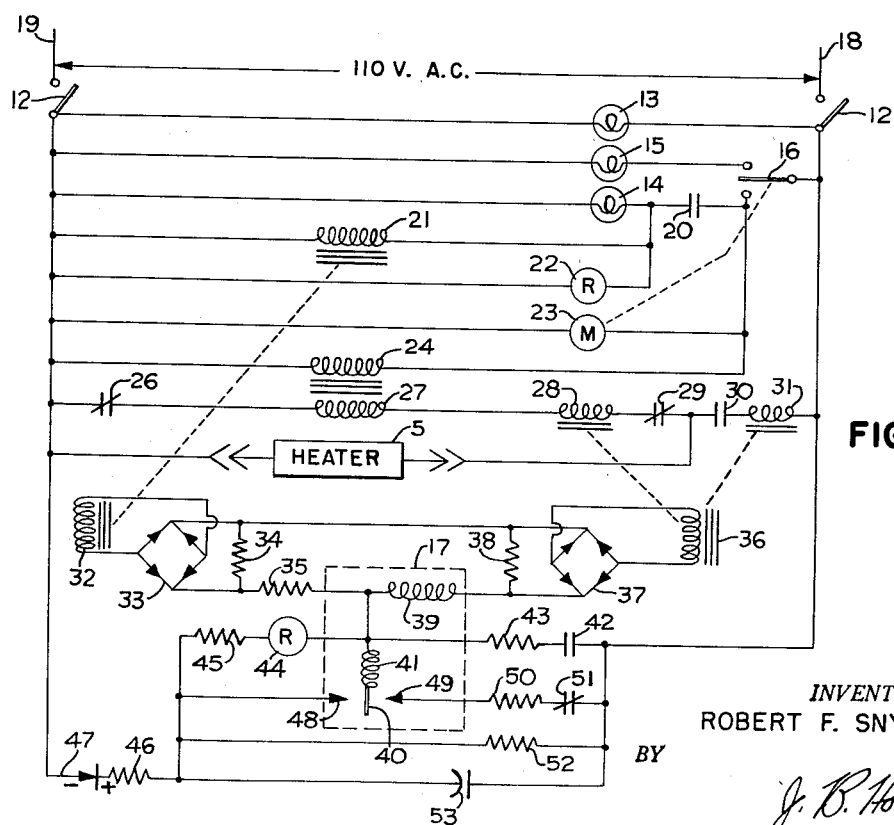
FIG. 2 is a schematic of the electrical control circuit.

FIG. 2 illustrates the control circuit used in the present invention. The two main power leads 18 and 19 are supplied power, for example 110 volt 60 cycle A.C., from a conventional commercial power source. The power is connected through leads 18 and 19 to the control circuit through the power-on switch 12. A power-on indicator light 13 is connected across leads 18 and 19 on the cold side of switch 12. Cure-finish indicator light 15 is connected from lead 19 through one pole of timer switch 16 to lead 18 on the cold side of switch 12. Heating light 14 is also connected from line 19 through normally open contacts 20 and the other pole of timer switch 16 to lead 18. The primary 21 of a transformer is connected in parallel with the power source from line 19 to a point between indicator light 14 and normally open contacts 20. A relay 22 is also connected to line 19 and to the same point as primary 21 of the transformer. Timer motor 23 is connected from line 19 to a point between the normally open contacts 20 and one pole of timer switch 16. The primary 24 of a second transformer is also connected directly between line 19 and the point between contacts 20 and timer 16. A lead connects line 19 through normally closed contacts 26, the secondary 27 of a transformer, one portion 28 of a split-primary transformer, normally closed contacts 29, normally open contacts 30 and the other proportion 31 of the split-primary transformer to lead 18. The electrical heating element 5 is connected between line 19 and a point between normally closed contacts 29 and normally open contacts 30. A transformer secondary 32 which is coupled to the primary 21 of a transformer is connected across a rectifying bridge 33. The out-put of bridge 33 is connected through resistances 34 and 35 to one side of a relay meter 17. Another transformer secondary 36 which is coupled to the split primaries 28 and 31 is connected to a second rectifying bridge 37. Rectifying bridge 37 having a resistance 38 across its output supplies a signal to meter relay 17. The relay meter 17 comprises a measure coil 39 to which the signals from the rectifying bridges are supplied in polar opposition. Meter contact 40 is connected through locking coil 41 to one side of the measure coil 39. Normally open contacts 42 connect from line 18 through resistor 43 to a point between the measuring coil 39 and the locking coil 41. From this point is also connected relay 44 to line 19 through resistors 45 and 46 and rectifier 47. One pole 48 in the relay meter, which will be referred to as "high," is connected to the line between resistor 45 and resistor 46. Another pole 49 of the relay meter, which will be referred to as "low," is connected through resistor 50 and normally closed contacts 51 to line 18. A resistor 52 and capacitor 53 are connected in parallel from line 18 to line 19 through resistor 46 and rectifier 47.

In the description of the operation of the control circuit, it will become apparent that certain control parameters may be varied over a substantial range without adversely affecting the operation of the system. However, the circuit will be described in terms of those parameters which have been selected for the particular operation of retreading a tire. In operation the system is energized by closing power-on switch 12 which causes power-on indicator light 13 to light. When the operator closes the timer switch 16, line voltage energizes primary 24 of the transformer which energizes the transformer secondary 27. The primary and secondary of the transformer are proportioned so that 12 volts are supplied to heater 5 through the circuit including normally closed contacts 26, heater 5, normally closed contacts 29, split transformer primary 28, and back to the secondary 27. It will be appreciated as the description proceeds that the meter relay receives no signal, and hence is protected, unless the timer switch is closed to its lower pole and heater 5 is in the circuit when the retread operation commences. Split primary 28 energizes transformer secondary 36 which is proportioned to place slightly more than 12 volts across rectifier 37 and thence to one side of measuring coil 39. Since the secondary 32 which is coupled to primary 21 of a transformer remains unenergized due to normally open contacts 20, no signal is sent to rectifier 33. Hence, relay meter 17 moves its contact 40 to pole 49 connecting the locking coil across the line. When timer switch 16 is set to the desired cure cycle and hence closed to its lower pole, due to the fact that relay 44 is now energized through low contact 49, normally open contacts 20 and 42 close. When contacts 20 close, relay 22 is energized which closes normally open contacts 30 and opens normally closed contacts 26 and 29. This transfers heater 5 from the 12 volt signal from secondary 27, which is now cut out of the circuit, to full line voltage of 110 volts and the electrical unit is rapidly heated to cure temperature. The current through the heater also passes through split primary winding 31 which supplies a signal to secondary 36 which is proportional to the current in the heater. Thus, even though the line voltage may vary, automatic correction is accomplished by the system since the meter relay receives signals which measure only the effective current in the heater. Since initially the heater is cold, the current through primary 31 will be high and therefore the signal through secondary 36 to rectifying bridge 37 will be large. This maintains contact 40 in its position against pole 49. Due to the closing of normally open contacts 20, secondary 32 is supplied a signal from its primary 21 which, through the ratio of the windings of the transformer, is set for 12 volts. As the heater warms up its resistance increases and hence the current in the heater and through transformer primary 31 decreases. As the heater approaches the desired pre-set temperature, the current lowers to the point where the signal from rectifying bridge 37 drops closer and closer to the value of being supplied from rectifying bridge 33. When the two voltages are equal the meter reads essentially zero. As the temperature in the heater reaches the desired high value, the signal from bridge 37 becomes weaker and weaker and hence the meter relay tends to disconnect low pole 49 and connect high pole 48. When this occurs relay 44 is shorted out and, as the current through the relay drops below its holding value, relay 44 is de-energized, opening contacts 20 which de-energizes relay 22 which returns to its normal condition. The entire control circuit is thus returned to its original condition and 12 volts is once more placed across the heater. However, since the heater is now hot and therefore of high resistance, a signal from rectifying bridge 37 remains low and the meter relay remains in contact with high pole 48. It can readily be appreciated that while the 12 volt signal to the heater is adequate for sensing purposes, it is sufficiently low so that it will cause no substantial heating in the unit 5. Hence, it is possible to sense the temperature of the heater constantly while it is at cure temperature without substantially affecting its temperature. When the electrical heating element cools down to a predetermined point, the current through primary 28 again becomes large, signaling rectifying bridge 37 through its secondary 36 and causing the meter relay once again to move to contact low pole 49. The circuit then once again enters the previously described cycle and high voltage, and hence high power, is once again sent to the heater 5 to bring it up to temperature.

At the conclusion of the cure, timer switch 16 moves to its upper pole, disconnecting the heat-on light and causing the cure-finish light to come on.

The great advantage of the present invention is thus apparent since it provides that when the bulky, slow heating, tire pulls heat rapidly away from the heating element during the initial warm-up period, the system constantly supplies energy to rapidly raise the whole tire to the desired temperature. In contrast with this, cycling controls which have an "off" period, respond to supply heat producing energy only after a definite interval and, hence, fail to minimize the overall cure time because the temperature of the heater drops rapidly during the "off" period. It is also apparent that when the tire has been raised to the desired temperature the present circuit instantly responds to the demands of the system, maintaining it at temperature with very little variation since the system has in effect no "blind" or "off" condition. In addition, because the difference between the high and low voltage point may be set to any value by choosing the ratio of the current transformer primary 28 and 31 to any desired value, the present system can provide extremely fine control. Furthermore, the position of the meter points "high" and "low" may be adjusted for any differential span to provide further control to maintain the heater temperature substantially constant. It is, of course, obvious that by providing a variable resistor in place of resistor 38 or a variable resistor across primary 28 the system can easily be calibrated.

While certain representative embodiments and details have been shown for the purpose of illustrating the invention, it will be apparent to those skilled in this art that various changes and modifications may be made therein without departing from the spirit or scope of the invention.

I claim:

1. In a control system for regulating the temperature of an electrical resistance heating element, the resistance of which varies with temperature, said system including a high potential power source and an electrical heating element to be heated thereby, an improved system for continuously monitoring the temperature of said element and for maintaining it within a desired temperature range comprising, in combination, switch means to connect said high potential to said heating element, first means in series with said potential source to derive a signal proportional to the current in said element and hence the temperature thereof when said element is connected to said high potential, means to provide a low voltage substantially incapable of heating said element, switch means to connect said low voltage to said heating element, second means in series with said low voltage and adapted to derive a signal proportional to the current in said element and hence the temperature thereof when said element is connected to said low voltage, means adapted to receive said signals from said first and second series means and to evaluate the temperature significance thereof in relation to a predetermined temperature standard, said means controlling said switch means to maintain the high potential connected to said element when it is below the desired predetermined temperature and to maintain said low voltage connected to said element when the element is within a predetermined range of said temperature.

2. In a control system for regulating the temperature of an electrical resistance heating element, the resistance of which varies with temperature, said system including a high potential power source and an electrical heating element to be heated thereby, an improved system for continuously monitoring the temperature of said element and for maintaining it within a desired temperature range comprising, in combination, switch means to connect said high potential to said heating element, first transformer means in series with said potential source to derive a signal proportional to the current in said element and hence the temperature thereof when said element is connected to said high potential, means to provide a low voltage substantially incapable of heating said element, switch means to connect said low voltage to said heating element, second transformer means in series with said low voltage and adapted to derive a signal proportional to the current in said element and hence the temperature thereof when said element is connected to said low voltage, means adapted to receive said signals from said first and second series means and to evaluate the temperature significance thereof in relation to a predetermined temperature standard, said means controlling said switch means to maintain the high potential connected to said element when it is below the desired predetermined temperature and to maintain said low voltage connected to said element when the element is within a predetermined range of said temperature.

3. In a control system for regulating the temperature of an electrical resistance heating element, the resistance of which varies with temperature, said system including a high potential power source and an electrical heating element to be heated thereby, an improved system for continuously monitoring the temperature of said element and for maintaining it within a desired temperature range comprising, in combination, switch means to connect said high potential to said heating element, first means in series with said potential source to derive a signal proportional to the current in said element and hence the temperature thereof when said element is connected to said high potential, transformer means connected to said high potential source to provide a low voltage substantially incapable of heating said element, switch means to connect said low voltage to said heating element, second means in series with said low voltage and adapted to derive a signal proportional to the current in said element and hence the temperature thereof when said element is connected to said low voltage, means adapted to receive said signals from said first and second series means and to evaluate the temperature significance thereof in relation to a predetermined temperature standard, said means controlling said switch means to maintain the high potential connected to said element when it is below the desired predetermined temperature and to maintain said low voltage connected to said element when the element is within a predetermined range of said temperature.

4. In a control system for regulating the temperature of an electrical resistance heating element, the resistance of which varies with temperature, said system including a high potential power source and an electrical heating element to be heated thereby, an improved system for continuously monitoring the temperature of said element and for maintaining it within a desired temperature range comprising, in combination, switch means to connect said high potential to said heating element, first transformer means in series with said potential source to derive a signal proportional to the current in said element and hence the temperature thereof when said element is connected to said high potential, transformer means connected to said high potential source to provide a low voltage substantially incapable of heating said element, switch means to connect said low voltage to said heating element, second transformer means in series with said low voltage and adapted to derive a signal proportional to the current in said element and hence the temperature thereof when said element is connected to said low voltage, means adapted to receive said signals from said first and second series means and to evaluate the temperature significance thereof in relation to a predetermined temperature standard, said means controlling said switch means to maintain the high potential connected to said element when it is below the desired predetermined temperature and to maintain said low voltage connected to said element when the element is within a predetermined range of said temperature.

5. In a control system for regulating the temperature of an electrical resistance heating element, the resistance of which varies with temperature, said system including a high potential power source and an electrical heating element to be heated thereby, an improved system for continuously monitoring the temperature of said element and for maintaining it within a desired temperature range comprising, in combination, switch means to connect said high potential to said heating element, first transformer means in series with said potential source to derive a signal proportional to the current in said element and hence the temperature thereof when said element is connected to said high potential, transformer means connected to said high potential source to provide a low voltage substantially incapable of heating said element, switch means to connect said low voltage to said heating element, second transformer means in series with said low voltage and adapted to derive a signal proportional to the current in said element and hence the temperature thereof when said element is connected to said low voltage, meter relay means adapted to receive said signals from said first and second series means and to evaluate the temperature significance thereof in relation to a predetermined temperature standard, said means controlling said switch means to maintain the high potential connected to said element when it is below the desired predetermined temperature and to maintain said low voltage connected to said element when the element is within a predetermined range of said temperature.

6. A control system for use in regulating the temperature of an electrical resistance heating element, the resistance of which is responsive to temperature variations, said system comprising, in combination, a power source, means to connect said power source to the heating element, parallel means to derive from said source a potential proportional to the voltage of said source, first means in series with said heating element to derive a potential proportional to the current in said element and consequently the temperature thereof when said element is connected to said power source, means coupled to said power source to produce therefrom a low voltage signal and impress it on said heating element when said element is disconnected from said power source, second means in series with said heating element adapted to derive from said low voltage signal a potential proportional to the current in said heating element and consequently the temperature thereof when said element is connected to said low voltage signal, means to present said series derived potentials in polar opposition to said parallel derived potential and to derive therefrom a signal representative of the difference therebetween, conducting means operable by said potential difference signal, and switch means controlled by said conducting means to disconnect said power source from said heating element and connect said low voltage means to said element when said element is at the desired predetermined temperature, said conducting means being adapted to reactuate said switch means to disconnect said low voltage means and reconnect said power source to said element when said element cools below the desired temperature.

7. A control system for use in regulating the temperature of an electrical resistance heating element, the resistance of which is responsive to temperature variations, said system comprising, in combination, a power source, means to connect said power source to the heating element, transformer means in parallel with said power source and adapted to derive therefrom a potential proportional to the voltage thereof, first transformer means in series with said heating element to derive a potential proportional to the current in said element and consequently the temperature thereof when said element is connected to said power source, means coupled to said power source to produce therefrom a low voltage signal and impress it on said heating element when said element is disconnected from said power source, second transformer means in series with said heating element adapted to derive from said low voltage signal a potential proportional to the current in said heating element and consequently the temperature thereof when said element is connected to said low voltage signal, means to present said series derived potentials in polar opposition to said parallel derived potential and to derive therefrom a signal representative of the difference therebetween, conducting means operable by said potential difference signal, and switch means controlled by said conducting means to disconnect said power source from said heating element and connect said low voltage means to said heating element when said element is at the desired predetermined temperature, said conducting means being adapted to reactuate said switch means to disconnect said low voltage means and reconnect said power source to said element when said element cools below the desired temperature.

8. A control system for use in regulating the temperature of an electrical resistance heating element, the resistance of which is responsive to temperature variations, said system comprising, in combination, a power source, means to connect said power source to the heating element, transformer means in parallel with said power source and adapted to derive therefrom a potential proportional to the voltage thereof, first transformer means in series with said heating element to derive a potential proportional to the current in said element and consequently the temperature thereof when said element is connected to said power source, transformer means coupled to said power source to produce therefrom a low voltage signal and impress it on said heating element when said element is disconnected from said power source, second transformer means in series with said heating element adapted to derive from said low voltage signal a potential proportional to the current in said heating element and consequently the temperature thereof when said element is connected to said low voltage signal, means to present either of said series derived potentials in polar opposition to said parallel derived potential and to derive therefrom a signal representative of the difference therebetween, conducting means operable by said potential difference signal, and switch means controlled by said conducting means to disconnect said power source from said heating element and connect said low voltage signal to said heating element when said element is at the desired predetermined temperature, said conducting means being adapted to reactuate said switch means to disconnect said low voltage means and reconnect said power source to said element when said element cools below the desired temperature.

9. A control system for use in regulating the temperature of an electrical resistance heating element, the resistance of which is responsive to temperature variations said system comprising, in combination, a high potential power source for heating said element, means to connect said power source to said element, parallel means to derive from said source a potential proportional to the voltage of said source, first means in series with said heating element and high potential source to derive a potential proportional to the current in said element and consequently the temperature thereof when said element is connected to said high potential source, a low potential power source, means to connect said low potential source to said heating element, second means in series with said heating element and said low potential source and adapted to derive therefrom a potential proportional to the current in said heating element and consequently the temperature thereof when said element is connected to said low potential source, means to present said series derived potentials in polar opposition to said parallel derived potential and to derive therefrom a signal representative of the difference therebetween, conducting means operable by said potential difference signal, and switch means controlled by said conducting means to disconnect said high potential source from said heating element and connect said low potential source to said heating element when said element is at the desired predetermined temperature, said conducting means also adapted to reactuate said switch means to disconnect said low potential source and reconnect said high potential source when said elements cool below the desired temperature.

10. A control system for use in regulating the temperature of an electrical resistance heating element, the resistance of which is responsive to temperature variations, said system comprising, in combination, a high potential power source for heating said element, means to connect said power source to said element, parallel transformer means to derive from said source a potential proportional to the voltage of said source, first transformer means in series with said heating element and high potential source to derive a potential proportional to the current in said element and consequently the temperature thereof when said element is connected to said high potential source, a low potential power source, means to connect said low potential source to said heating element, second transformer means in series with said heating element and said low potential source and adapted to derive therefrom a potential proportional to the current in said heating element and consequently the temperature thereof when said element is connected to said low potential source, means to present said series derived potentials in polar opposition to said parallel derived potential and to derive therefrom a signal representative of the difference therebetween, conducting means operable by said potential difference signal, and switch means controlled by said conducting means to disconnect said high potential source from said heating element and connect said low potential source to said heating element when said element is at the desired predetermined temperature, said conducting means also adapted to reactuate said switch means to disconnect said low potential source and reconnect said high potential source when said elements cool below the desired temperature.

11. A control system for use in regulating the temperature of an electrical resistance heating element, the resistance of which is responsive to temperature variations, said system comprising, in combination, a high potential power source for heating said element, means to connect said power source to said element, parallel transformer means to derive from said source a potential proportional to the voltage of said source, first transformer means in series with said heating element and high potential source to derive a potential proportional to the current in said element and consequently the temperature thereof when said element is connected to said high potential source, a low potential power source, means to connect said low potential source to said heating element, second transformer means in series with said heating element and said low potential source and adapted to derive therefrom a potential proportional to the current in said heating element and consequently the temperature thereof when said element is connected to said low potential source, rectifying bridge means to present said series derived potentials in polar opposition to said parallel derived potential and to derive therefrom a signal representative of the difference therebetween, conducting means operable by said potential difference signal, and switch means controlled by said conducting means to disconnect said high potential source from said heating element and connect said low potential source to said heating element when said element is at the desired predetermined temperature, said conducting means also adapted to reactuate said switch means to disconnect said low potential source and reconnect said high potential source when said elements cool below the desired temperature.

12. A control system for use in regulating the temperature of an electrical resistance heating element, the resistance of which is responsive to temperature variations, said system comprising, in combination, a high potential power source for heating said element, means to connect said power source to said element, parallel transformer means to derive from said source a potential proportional to the voltage of said source, first transformer means in series with said heating element and high potential source to derive a potential proportional to the current in said element and consequently the temperature thereof when said element is connected to said high potential source, a low potential power source, means to connect said low potential source to said heating element, second transformer means in series with said heating element and said low potential source and adapted to derive therefrom a potential proportional to the current in said heating element and consequently the temperature thereof when said element is connected to said low potential source, rectifying bridge means to present said series derived potentials in polar opposition to said parallel derived potential and to derive therefrom a signal representative of the difference therebetween, meter relay means operable by said potential difference signal, and switch means controlled by said conducting means to disconnect said high potential source from said heating element and connect said low potential source to said heating element when said element is at the desired predetermined temperature, said meter relay means also adapted to reactuate said switch means to disconnect said low potential source and reconnect said high potential source when said elements cool below the desired temperature.

13. The method of continuously monitoring the temperature of an electrical heating element whose resistance varies with temperature and which is intermittently connected to a source of electrical energy to maintain it substantially at a predetermined temperature comprising providing a high potential capable of heating said element and a low potential substantially incapable of heating said element, connecting said element to said high potential to heat it thereby to the desired predetermined temperature, meanwhile measuring the resistance of said element to determine the temperature thereof by measuring the current therethrough due to said high potential, disconnecting said element from said high potential when the desired temperature is reached and connecting said element to said low potential, measuring the current through said element due to said low potential and thereby determining its temperature, and disconnecting said element from said low potential and reconnecting it to said high potential when its temperature drops below the desired predetermined temperature.

14. The method of controlling the temperature of an electrical heating element to maintain it at a predetermined temperature comprising a high voltage heating source and a low voltage monitoring source, connecting the high voltage source to said heating element to heat it thereby and determining the temperature of the heating element by measuring the current therethrough due to the high voltage while heating the element, disconnecting said high voltage from said source when it reaches the desired predetermined temperature and connecting said low voltage source to said heating element and determining the temperature thereof by measuring the current therethrough due to the low voltage source, and disconnecting said low voltage source and reconnecting said high voltage source when the element cools below the predetermined temperature.

References Cited in the file of this patent
UNITED STATES PATENTS

| | | |
|---|---|---|
| 1,566,980 | Seede | Dec. 22, 1925 |
| 2,549,095 | Huck | Apr. 17, 1951 |
| 2,769,076 | Bogdan | Oct. 30, 1956 |
| 2,784,288 | Moran et al. | Mar. 5, 1957 |